United States Patent
Sowers et al.

(10) Patent No.: US 8,478,456 B2
(45) Date of Patent: Jul. 2, 2013

(54) VARIABLE BANDWIDTH CONTROL ACTUATION METHODS AND APPARATUS

(75) Inventors: Jeffery P. Sowers, Orlando, FL (US); Karl F. Spiessbach, Tucson, AZ (US); Donald E. Croft, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 15 days.

(21) Appl. No.: 13/205,259

(22) Filed: Aug. 8, 2011

(65) Prior Publication Data

US 2013/0041527 A1 Feb. 14, 2013

(51) Int. Cl.
*G01C 23/00* (2006.01)

(52) U.S. Cl.
USPC ........ 701/3; 701/4; 701/12; 701/14; 701/300; 244/3.14; 244/3.18; 244/3.21; 244/3.22; 244/76 R; 244/135 A; 244/164; 244/184; 244/189; 244/191; 244/226; 310/328; 324/750; 348/117; 416/1

(58) Field of Classification Search
USPC ..................... 701/3, 4, 12, 14, 300; 244/3.14, 244/3.18, 3.21, 3.22, 76 R, 135 A, 164, 184, 244/189, 191, 226; 310/328; 324/750; 348/117; 416/1
See application file for complete search history.

(56) References Cited

U.S. PATENT DOCUMENTS

| | | | | |
|---|---|---|---|---|
| 3,011,741 A * | 12/1961 | Denniston | ...................... | 244/226 |
| 3,223,363 A * | 12/1965 | Boothby et al. | .............. | 244/184 |
| 3,279,725 A * | 10/1966 | Andrew et al. | ............... | 244/191 |
| 3,301,508 A * | 1/1967 | Yamron | ........................ | 244/3.18 |
| 4,330,829 A * | 5/1982 | Fischer et al. | ................... | 701/12 |
| 5,079,711 A * | 1/1992 | Lambregts et al. | ............... | 701/3 |
| 5,440,193 A * | 8/1995 | Barrett | .......................... | 310/328 |
| 6,092,007 A * | 7/2000 | Cotton et al. | ...................... | 701/4 |
| 6,868,314 B1 * | 3/2005 | Frink | ............................... | 701/3 |
| 6,889,941 B1 * | 5/2005 | McElreath et al. | ........ | 244/135 A |
| 7,357,356 B1 * | 4/2008 | Goodzeit et al. | ............. | 244/164 |
| 7,418,343 B1 * | 8/2008 | McGraw et al. | ............... | 701/300 |
| 7,945,355 B2 * | 5/2011 | Akalinli et al. | ................. | 701/14 |
| 8,123,173 B1 * | 2/2012 | Goodzeit et al. | ............. | 244/164 |
| 2004/0010354 A1 * | 1/2004 | Nicholas et al. | ................... | 701/4 |
| 2007/0233330 A1 * | 10/2007 | Beutler et al. | .................... | 701/3 |
| 2007/0246610 A1 * | 10/2007 | Rath et al. | ...................... | 244/189 |
| 2008/0094081 A1 * | 4/2008 | Nguyen et al. | ................ | 324/750 |
| 2008/0169384 A1 * | 7/2008 | Adams et al. | ............... | 244/76 R |
| 2008/0249669 A1 * | 10/2008 | Skarman | ........................... | 701/3 |
| 2010/0147992 A1 * | 6/2010 | Mock | ........................... | 244/3.22 |
| 2011/0038727 A1 * | 2/2011 | Vos et al. | .......................... | 416/1 |
| 2011/0169943 A1 * | 7/2011 | Bachman et al. | ............. | 348/117 |
| 2011/0180654 A1 * | 7/2011 | Thiesen et al. | ............... | 244/3.14 |
| 2012/0078446 A1 * | 3/2012 | Cameron | .......................... | 701/3 |
| 2012/0211593 A1 * | 8/2012 | Morris et al. | ................ | 244/3.21 |

* cited by examiner

*Primary Examiner* — James P Trammell
*Assistant Examiner* — Sanjeev Malhotra
(74) *Attorney, Agent, or Firm* — Eric A. Gifford

(57) ABSTRACT

Some embodiments relate to a method of controlling a flight of a flight vehicle according to a first mode of operation and changing the mode of operation to a second mode of operation having a different bandwidth than the first mode of operation. Other embodiments relate to a flight-control system for a flight vehicle configured to control a flight of a flight vehicle according to a first mode of operation and to control the flight of the flight vehicle according to a second mode of operation to use less energy than the first mode of operation. Other embodiments relate to a control actuation system configured to control positions of aerodynamic elements in a flight vehicle in response to commands from a guidance system according to a first mode of operation and to change the mode of operation to a second mode of operation having a different bandwidth than the first mode of operation.

18 Claims, 4 Drawing Sheets

VARIABLE BANDWIDTH CONTROL ACTUATION METHODS AND APPARATUS

TECHNICAL FIELD

Embodiments pertain to flight vehicles, including munitions, missiles, ballistic missiles and unmanned aerial vehicles (UAVs). Some embodiments relate to performance, power and heat management of flight vehicles.

BACKGROUND

Many flight vehicles use controllable aerodynamic surfaces, such as fins or canards, to control a flight path of the flight vehicle. Movements of the aerodynamic surfaces can be controlled by a control actuation system in the flight vehicle.

The control actuation system can include multiple electro-mechanical actuators. For example, a brushless direct-current (DC) motor to drive a gear and/or linkage system can position each aerodynamic surface. The control actuation system can be powered by a power source such as a battery.

The performance of a flight vehicle is limited by these components. For example, a flight vehicle will have volume and weight constraints that limit the size of the power source. The electro-mechanical actuators will dissipate electrical power that often leads to unwanted heating of the electro-mechanical actuators. The constraints on the size of the power source and the need to manage the heating of the electro-mechanical actuators limit the performance and range of a flight vehicle.

What are needed are improved control actuation systems that manage power and heating in a flight vehicle to improve performance.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As used herein, a flight vehicle refers to munitions, missiles, ballistic missiles and unmanned aerial vehicles (UAVs).

The inventors have discovered that the challenge of managing performance, power, and heating in a flight vehicle, as well as others, can be addressed by operating the flight vehicle according to two or more different modes of operation. Fin position commands from a guidance system often require periods of high frequency activity and a high-power response from a control actuation system to adjust the fins, such as during the launch of the flight vehicle, course corrections, or terminal guidance. These periods of high frequency fin activity are often of short time duration. Much of a flight of the flight vehicle is characterized by commands for low frequency activity by the fins and the control actuation system that requires less power. The flight vehicle can be operated in a performance mode during the periods of high frequency activity of the fins, and the flight vehicle can be operated in an economy mode during the periods of low frequency activity of the fins to manage performance, power, and heating.

Figure 1:
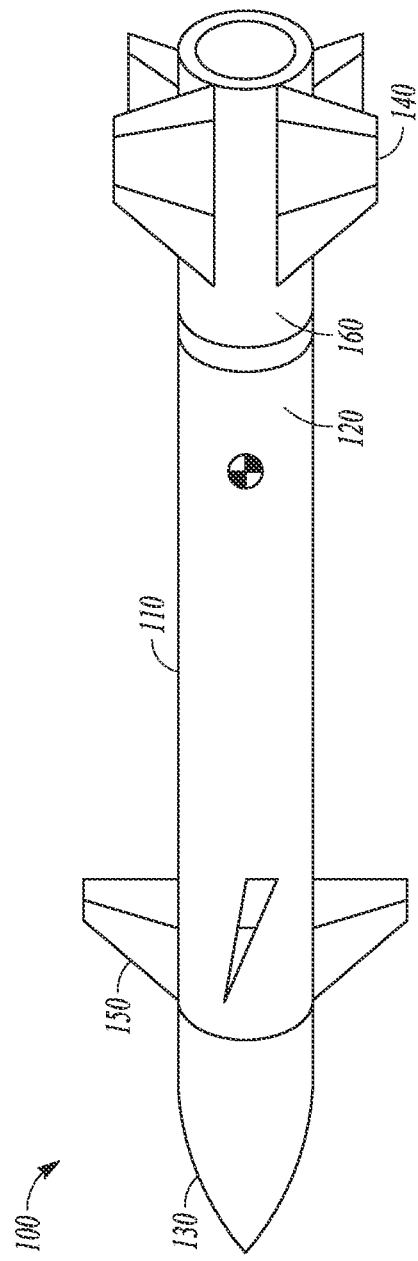
FIG. 1 illustrates a flight vehicle in accordance with some embodiments.

FIG. 1 illustrates a flight vehicle 100 in accordance with some embodiments. The flight vehicle 100 can be a self-propelled guided missile. Components of the flight vehicle 100 will be identified by the same reference numerals throughout FIGS. 1-3 for purposes of brevity and clarity. The flight vehicle 100 has an airframe structure 110 of steel or a composite material. A propulsion system 120 inside the airframe structure 110 may accelerate the flight vehicle 100 toward a destination (e.g., a target). The propulsion system 120 may be a solid rocket motor or a jet engine or a ramjet. A guidance system 130 inside the airframe structure 110 in front of the propulsion system 120 may generate commands to guide the flight vehicle 100 toward its destination. Fins 140 and canards 150 are aerodynamic elements on the surface of the airframe structure 110. The positions of the fins 140 and canards 150 determine the aerodynamic forces that act on the fins 140 and canards 150, and these forces are used to guide the flight path of the flight vehicle 100. A control actuation system (CAS) 160 inside the airframe structure 110 near the fins 140 may receive the commands from the guidance system 130 and may control movements, such as rotations, of the fins 140 and/or canards 150 in response to the commands.

Figure 2:
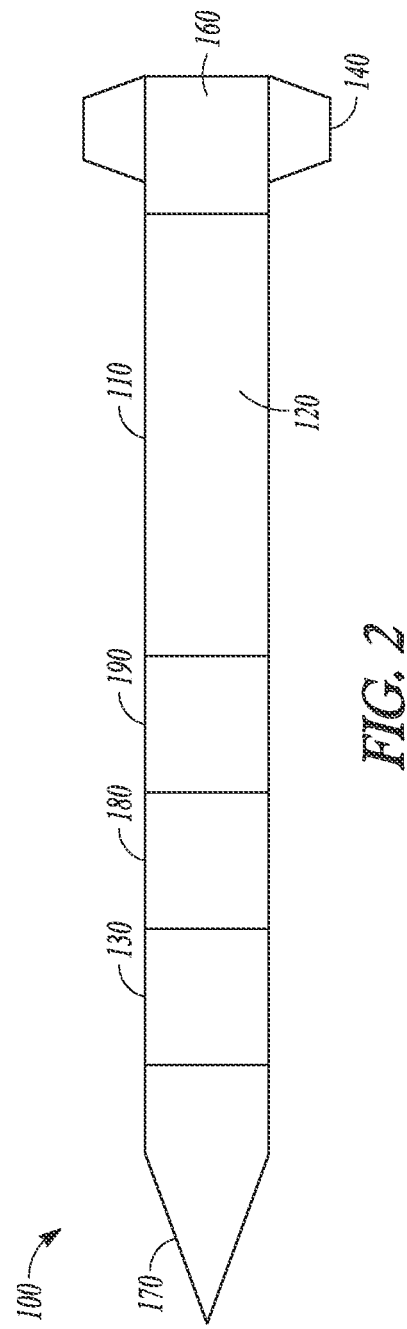
FIG. 2 is a block diagram of a flight vehicle in accordance with some embodiments.

FIG. 2 is a block diagram of the flight vehicle 100 in accordance with some embodiments. In addition to the components described with respect to FIG. 1, the flight vehicle 100 includes a seeker 170 inside the airframe structure 110 in front of the guidance system 130. A target detector and fuse 180 is inside the airframe structure 110 behind the guidance system 130. The target detector and fuse 180 may detect when the flight vehicle 100 has arrived at its destination and the fuse may detonate an explosive warhead 190 inside the airframe structure 100 between the target detector and fuse 180 and the propulsion system 120.

Figure 3:
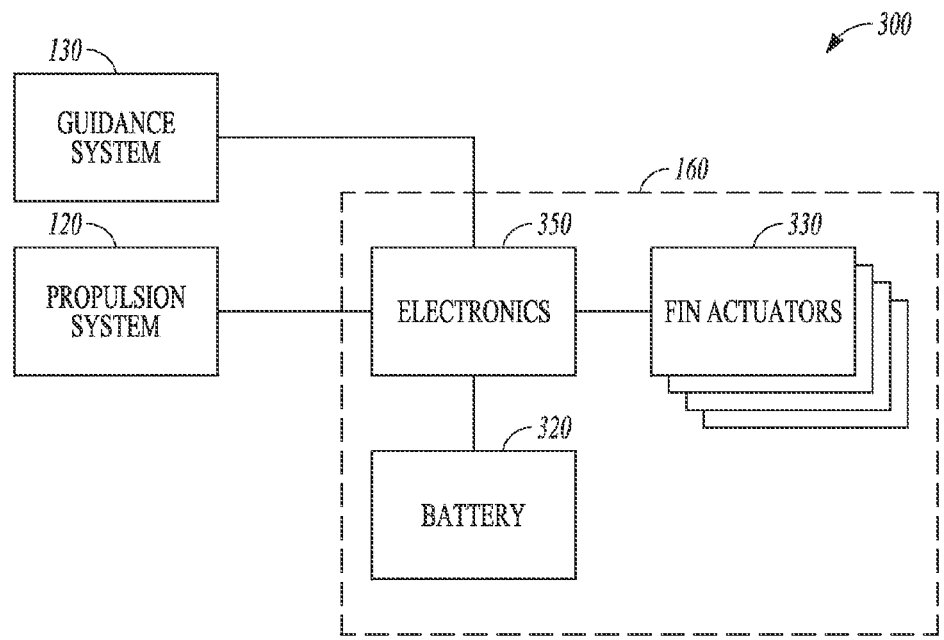
FIG. 3 is a block diagram of a flight control system in accordance with some embodiments.

FIG. 3 is a block diagram of a flight control system 300 in accordance with some embodiments. The flight control system 300 is located inside the airframe structure 110 of the flight vehicle 100. The flight control system 300 includes the propulsion system 120, the guidance system 130 and the CAS 160 (FIGS. 1-2). The CAS 160 includes a power source, such as battery 320, and multiple fin actuators 330 that are mechanically linked to control movements of the fins 140. The fin actuators 330 may be electro-mechanical actuators such as brushless direct-current (DC) motors. The fin actuators 330 may also be hydraulic actuators or pneumatic actuators. Each fin 140 can be mounted on a shaft to be rotated by one of the electro-mechanical actuators through a gear and/or a linkage system.

The CAS 160 includes CAS electronics block 350 that receives electrical power from the battery 320 and can control movements of the fin actuators 330. The CAS electronics block 350 includes sensors to measure physical states of the fin actuators 330 and the fins 140. The CAS 160 is coupled to receive information from the propulsion system 120 and the commands from the guidance system 130.

Figure 4:
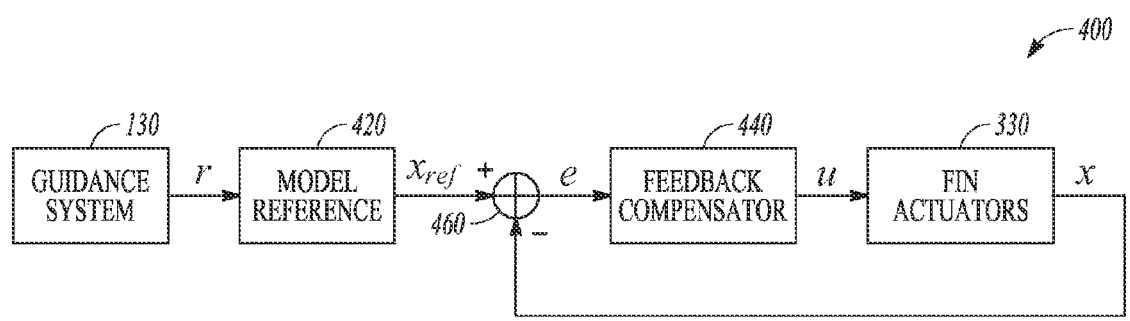
FIG. 4 is a functional block diagram of a flight control system in accordance with some embodiments.

FIG. 4 is a functional block diagram of a flight control system 400 in accordance with some embodiments. The flight control system 400 may be suitable for use as a flight control system of the flight vehicle 100 (FIGS. 1-3), although other flight control systems may also be suitable. The flight control system 400 may include, among other things, the guidance system 130 (FIGS. 1-3), a model reference pre-filter block 420, a feedback compensator block 440 and the fin actuators 330 described above.

In accordance with embodiments, the guidance system 130 executes a set of algorithms to determine required accelerations and fin positions of the flight vehicle 100 to direct the flight vehicle 100 to arrive at its destination. The guidance system 130 can produce a guidance command, r, to direct an adjustment of the position of one of the fins 140.

The guidance command r is sent to the model reference pre-filter block 420 to shape the guidance command r to limit the bandwidth of the execution of the guidance command r. The activities of the model reference pre-filter block 420 are further described with reference to FIG. 5. The model reference pre-filter block 420 issues reference state commands $X_{ref}$, such as position and rate, to be used in the feedback compensator block 440. For the purposes of this document, position refers to a location of a fin 140, rate refers to a velocity of the fin 140, and acceleration refers to an acceleration of the fin 140.

The reference state commands $X_{ref}$ are received by a summing junction 460 that also receives a feedback signal x from the fin actuators 330. The feedback signal x contains measurements of the physical states of the fins 140 in the CAS 160 described above. The feedback signal x can include the position and rate of the fins 140. The summing junction 460 can subtract the feedback signal x from the reference state commands $X_{ref}$ to compute state errors e.

The feedback compensator block 440 can act on the state errors e to produce an actuating signal u that is coupled to the fin actuators 330. The feedback compensator block 440 is implemented in the CAS electronics block 350.

Figure 5:
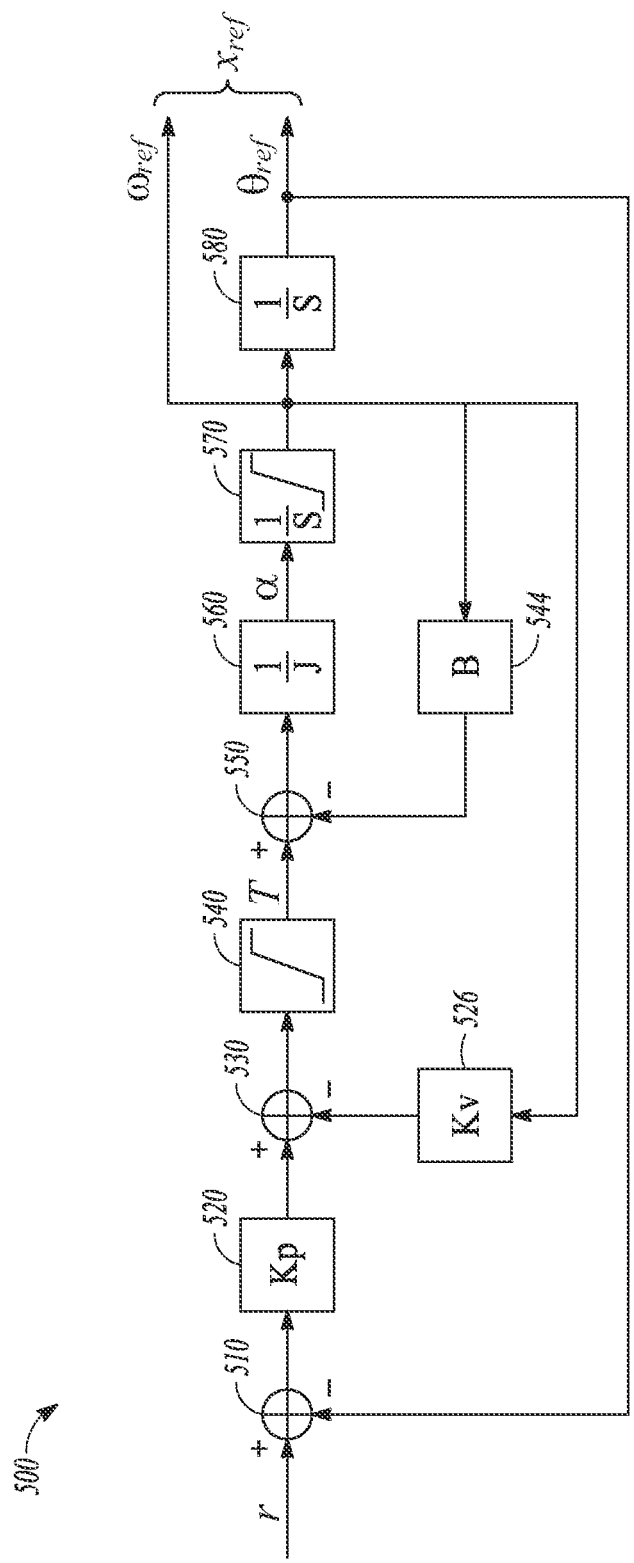
FIG. 5 is a functional block diagram of a model reference pre-filter block in accordance with some embodiments.

FIG. 5 is a functional block diagram of a model reference pre-filter block 500 in accordance with some embodiments. The model reference pre-filter block 500 may be suitable for use as the model reference pre-filter block 420 shown (FIG. 4), although other configurations may also be suitable.

In these embodiments, the model reference pre-filter block 500 executes a second order system of differential equations with respect to a guidance command r as an input to shape the guidance command r to limit the bandwidth of adjustments of the position of one of the fins 140. The guidance command r can be from the guidance system 130 (FIG. 4) and can command an adjustment of a position of one of the fins 140. The model reference pre-filter block 500 is in physical variable form in the Laplace domain with an inertia constant J and a friction coefficient B representing physical values of a control actuation system. Two feedback gains $K_p$ and $K_v$ can be selected to produce different dynamic responses or bandwidths for the guidance command r.

A summing junction 510 can compute a position error by subtracting a model position state $\theta_{ref}$ from the guidance command r. A position proportional gain $K_p$ 520 can compensate the position error to produce a rate command. A summing junction 530 can compute an error in the rate command from the position proportional gain $K_p$ 520 by subtracting a rate feedback gain $K_v$ 526 of a model rate state $\omega_{ref}$ (described below) to generate a torque command. A torque limit block 540 can limit the torque command to be within a predetermined value. The torque limit block 540 can generate a limited torque command T.

A viscous friction block 544 can multiply the model rate state $\omega_{ref}$ by a viscous friction coefficient B to produce a friction resistance torque. A summing junction 550 can compute a net torque by subtracting the friction resistance torque generated by the viscous friction block 544 from the limited torque command T from the torque limit block 540. An inertia block 560 can divide the net torque by an inertia J of the fin 140 to produce an acceleration α of the fin 140. A first integration block 570 can integrate the acceleration α from the inertia block 560 to generate the model rate state $\omega_{ref}$ that is coupled to the viscous friction block 544. The model rate state $\omega_{ref}$ can be limited to a minimum or a maximum value by the first integration block 570. A second integration block 580 can integrate the model rate state $\omega_{ref}$ to generate the model position state $\theta_{ref}$. The model position state $\theta_{ref}$ is coupled to the summing junction 510 described above. The model rate state $\omega_{ref}$ and the model position state $\theta_{ref}$ are outputs of the model reference pre-filter block 500 to be used in the feedback compensator block 440 of the flight control system 400 (FIG. 4).

A linearized solution of the second order differential equations of the model reference pre-filter block 500 can be expressed in the Laplace domain as $$\frac{\theta_{ref}(s)}{r(s)} = \frac{K_p/J}{s^2 + (B/J + K_v/J)s + K_p/J}. \tag{1}$$

This equation then can be transformed into a generalized solution of second order differential equations such that $$\frac{\theta_{ref}(s)}{r(s)} = \frac{\omega_n^2}{s^2 + 2\varsigma\omega_n s + \omega_n^2}. \tag{2}$$

In this generalized form, $\omega_n$ is considered the natural frequency of the system and $\varsigma$ the damping ratio of the system. The combination of these two parameters determines the bandwidth of the model reference pre-filter block 500.

For any particular combination of $\omega_n$ and $\varsigma$ in (2), the feedback gains $K_p$ and $K_K$ can be solved such that $$K_p = \omega_n^2 J \tag{3}$$

and $$K_v = 2\varsigma\omega_n J - B \tag{4}.$$

The gains $K_p$ and $K_v$ can then be scheduled by the guidance system 130 during the flight of the flight vehicle 100 such that the CAS 160 provides a high bandwidth response during periods in which the flight vehicle 100 (FIGS. 1-2) needs high frequency activity in the fins and a lower bandwidth response during periods when the flight vehicle 100 does not require high performance. The high bandwidth response is provided with the performance mode of operation during, for example, the launch of the flight vehicle 100, course corrections and guidance to a destination. The low bandwidth response is provided with the economy mode of operation at times when the performance mode of operation is not needed, such as, for example, while the flight vehicle 100 is cruising. The economy mode of operation uses less energy than the performance mode of operation. Positions of the fins 140 are adjusted over a broader range of frequencies during the performance mode of operation and over a narrower range of frequencies during the economy mode of operation.

In the solution of the second order differential equations of the model reference pre-filter block 500, state variables such as model rate state $\omega_{ref}$ or other intermediate calculations such as torque T or acceleration α can be limited in the economy mode of operation to conserve energy.

In other embodiments, the model reference pre-filter block 500 can execute a higher order system of differential equations with respect to a guidance command r as an input to shape the guidance command r to limit the bandwidth of adjustments of the position of one of the fins 140.

Figure 6:
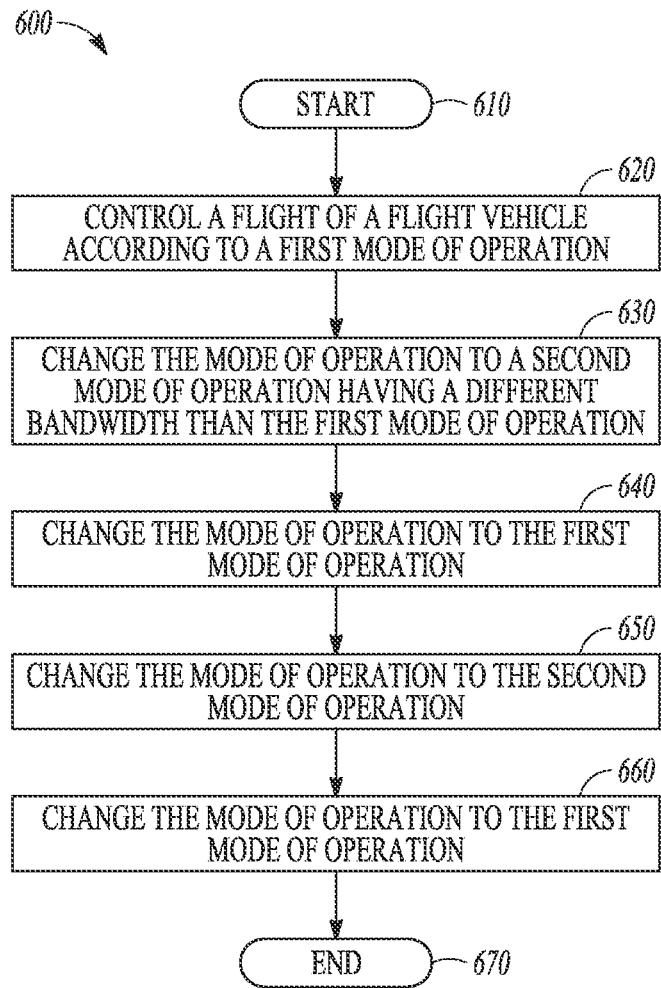
FIG. 6 is a flowchart illustrating an example method of flight control in accordance with some embodiments.

As shown in FIG. 6, still other embodiments relate to a method 600 of flight control. The method 600 starts in box 610. As shown in box 620, the method 600 includes controlling a flight of a flight vehicle according to a first mode of operation. The first mode of operation is the performance mode of operation used, for example, during the launch of the flight vehicle 100 in box 620.

As shown in box 630, the method 600 includes changing the mode of operation to a second mode of operation having a different bandwidth than the first mode of operation. The second mode of operation is the economy mode of operation used, for example, when the flight vehicle 100 is cruising in box 630.

As shown in box 640, the method 600 further includes changing the mode of operation to the first mode of operation. The first mode of operation is the performance mode of operation used, for example, during a course correction of the flight vehicle 100 in box 640.

As shown in box 650, the method 600 further includes changing the mode of operation to the second mode of operation. The second mode of operation is the economy mode of operation used, for example, when the flight vehicle 100 is cruising in box 650.

As shown in box 660, the method 600 further includes changing the mode of operation to the first mode of operation. The first mode of operation is the performance mode of operation used, for example, when the flight vehicle 100 is being guided toward a destination in box 660. The method 600 ends in box 670.

The flight vehicle 100 (FIGS. 1-2) can be operated in more than two modes of operation in accordance with some embodiments. For example, the mode of operation can be changed from the performance mode of operation to the economy mode of operation, back to the performance mode of operation and then to a medium mode of operation during the flight. The flight vehicle 100 can fly in the medium mode of operation during course corrections, for example. Positions of the fins 140 can be adjusted over a medium range of frequencies during the medium mode of operation between the broader range of frequencies of the performance mode of operation and the narrower range of frequencies of the economy mode of operation. The energy used during the medium mode of operation can be between the higher energy use of the performance mode of operation and the lower energy use of the economy mode of operation. For example, the economy mode of operation may use 50% of the energy used during the performance mode of operation, and the medium mode of operation may use 75% of the energy used during the performance mode of operation. The economy and medium modes of operation result in less performance capability than the performance mode of operation.

The mode of operation can be changed by the commands from the guidance system 130 in response to a flight plan of the flight vehicle 100 while the flight vehicle is in flight. The mode of operation can also be changed by a remote transmission to the flight vehicle 100; such a remote transmission can either change the flight plan or change the mode directly.

The embodiments shown and described herein can save power and can reduce heating in flight vehicles. The embodiments can support longer flight durations and smaller power sources in flight vehicles.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the flight vehicle 100 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A flight-control system for a flight vehicle configured to:
   control a flight of a flight vehicle according to a first mode of operation;
   control the flight of the flight vehicle according to a second mode of operation to use less energy than the first mode of operation,
      wherein the first mode of operation is a performance mode of operation in which aerodynamic elements of the vehicle are controlled with a higher-bandwidth response, and
      wherein the second mode of operation is an economy mode of operation in which the aerodynamic elements of the vehicle are controlled with a lower-bandwidth response;
   receive guidance commands to guide the flight vehicle in flight;
   pre-filter the guidance commands according to the performance mode of operation or the economy mode of operation to issue reference state commands;
   issue state errors as a sum of the reference state commands and a feedback signal containing measurements of the physical states of the aerodynamic elements in a control loop; and
   act on the state errors to produce an actuating signal that controls the positions of the aerodynamic elements.

2. The flight-control system of claim 1, further configured to change the mode of operation from the first mode of operation to the second mode of operation when the flight vehicle is cruising.

3. The flight-control system of claim 2, further configured to change the mode of operation from the second mode of operation to the first mode of operation when the flight vehicle is being guided to a destination.

4. The flight-control system of claim 2, further configured to change the mode of operation from the first mode of operation to a medium mode of operation or from the second mode of operation to the medium mode of operation during a course correction of the flight vehicle, the medium mode of operation has a bandwidth response between the first mode of operation and the second mode of operation.

5. The flight-control system of claim 1, further configured to:
adjust positions of the aerodynamic elements of the flight vehicle over a first range of frequencies during the first mode of operation; and
adjust the positions of the aerodynamic elements over a second range of frequencies during the second mode of operation, the second range of frequencies being narrower than the first range of frequencies.

6. The flight-control system of claim 1, further configured to change the mode of operation in response to a remote transmission.

7. The flight-control system of claim 1, further configured to change the mode of operation in response to a flight plan of the flight vehicle while the flight vehicle is in flight.

8. The flight-control system of claim 1, further configured to control the flight of the flight vehicle according to the first mode of operation during a launch of the flight vehicle.

9. A method to control a flight of a flight vehicle comprising:
controlling a flight of a flight vehicle according to a performance mode of operation in which aerodynamic elements of the vehicle are controlled with a higher bandwidth response;
changing the mode of operation to an economy mode of operation in which the aerodynamic elements of the vehicle are controlled with a lower bandwidth response using less energy than the performance mode of operation when the flight vehicle is cruising;
receiving guidance commands to guide the flight vehicle in flight;
pre-filtering the guidance commands according to the performance mode of operation or the economy mode of operation to issue reference state commands;
issuing state errors as a sum of the reference state commands and a feedback signal containing measurements of the physical states of the aerodynamic elements in a control loop; and
acting on the state errors to produce an actuating signal that controls the positions of the aerodynamic elements.

10. The method of claim 9, wherein changing the mode of operation includes
receiving commands from a guidance system;
executing the commands to change the mode of operation to the economy mode of operation.

11. The method of claim 10, wherein executing the commands includes executing the commands with a second order system of differential equations that model acceleration, velocity and position of aerodynamic elements of the flight vehicle with a first set of feedback gains to reduce a bandwidth of adjustments of the aerodynamic elements.

12. The method of claim 11, further comprising changing the mode of operation to the performance mode of operation by executing the commands with the second order system of differential equations with a second set of feedback gains to increase the bandwidth of the adjustments of the aerodynamic elements during a course correction of the flight vehicle or during guidance of the flight vehicle to a destination.

13. The method of claim 10, wherein executing the commands includes executing the commands with torque limits and velocity limits.

14. The method of claim 9, wherein changing the mode of operation includes
receiving commands from a guidance system;
reducing a bandwidth of adjustments of aerodynamic elements on the flight vehicle to change the mode of operation to the economy mode of operation.

15. The method of claim 9, wherein controlling the flight of the flight vehicle includes
adjusting positions of aerodynamic elements of the flight vehicle over a first range of frequencies during the performance mode of operation; and
adjusting the positions of the aerodynamic elements over a second range of frequencies during the economy mode of operation, the second range of frequencies being narrower than the first range of frequencies.

16. The method of claim 11, controlling the flight of the flight vehicle includes
accelerating the flight vehicle with a propulsion system;
receiving commands from a guidance system; and
adjusting positions of fins on the flight vehicle with electromagnetic actuators in response to the commands from the guidance system.

17. The flight-control system of claim 1, further configured to pre-filter the guidance commands to:
issue reference state commands according to the performance mode of operation by executing the guidance commands with a second order system of differential equations that model acceleration, velocity and position of the aerodynamic elements with a first set of feedback gains; and
issue reference state commands according to the economy mode of operation having a narrower bandwidth than the performance mode of operation by executing the commands with the second order system of differential equations with a second set of feedback gains that are different than the first set of feedback gains.

18. The flight-control system of claim 17, further configured to pre-filter the guidance commands to change the mode of operation between the first mode of operation and the second mode of operation by changing only the set of feedback gains between said first set and said second set.

* * * * *